UNITED STATES PATENT OFFICE.

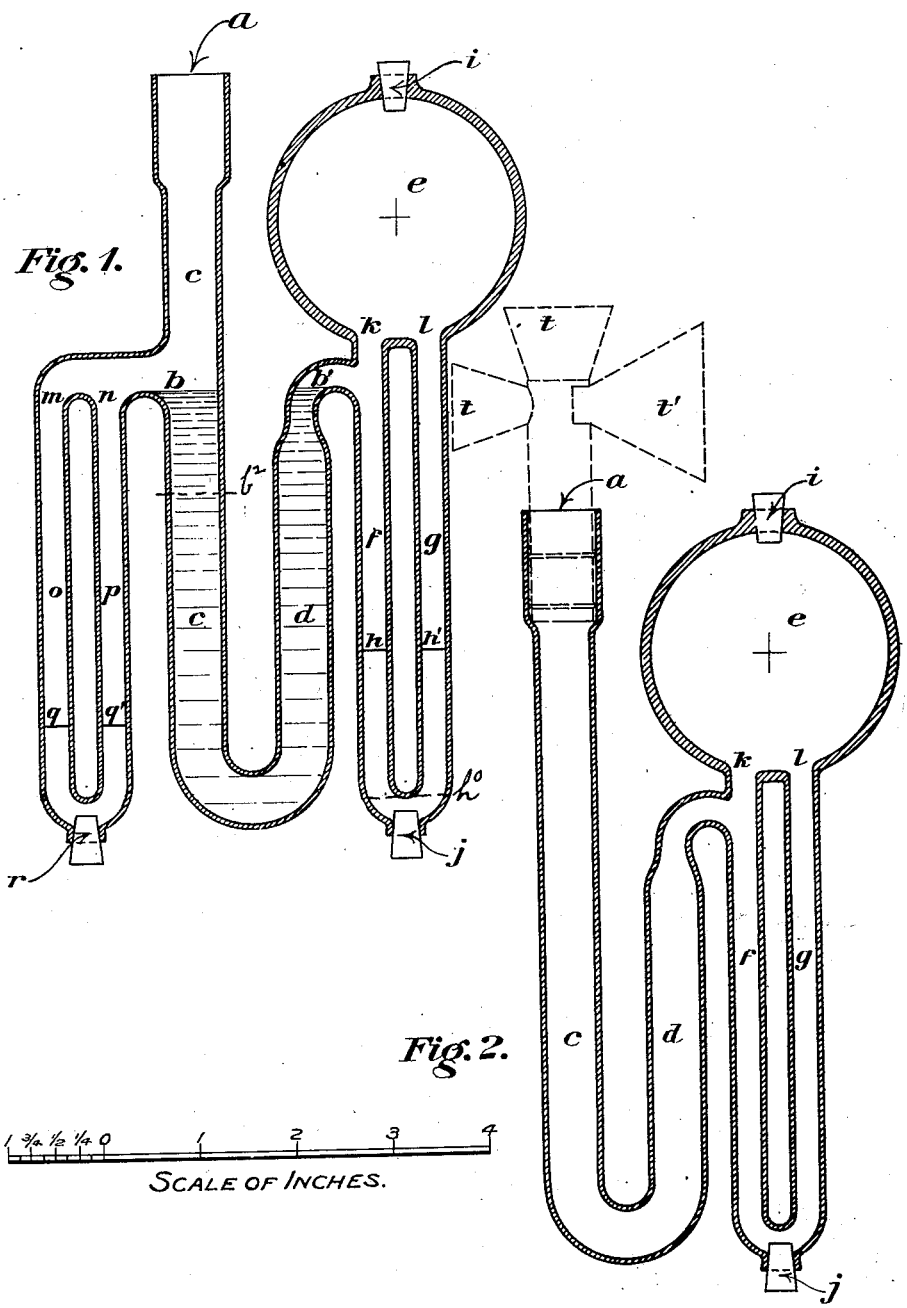

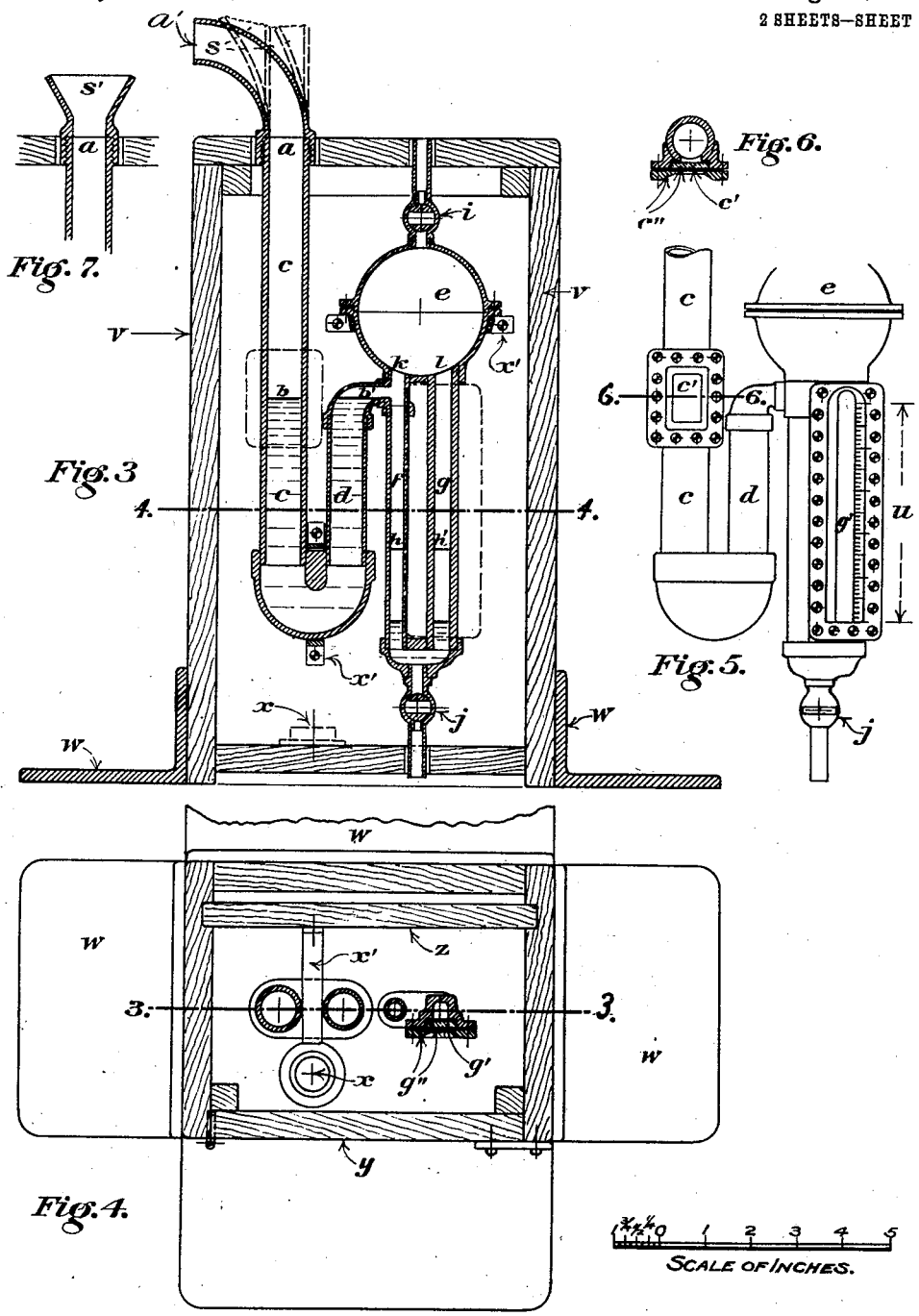

EDWARD H. SCHULZ, OF FORT WADSWORTH, NEW YORK.

BLAST AND PRESSURE METER.

No. 931,348.  Specification of Letters Patent.  Patented Aug. 17, 1909.

Application filed May 11, 1905. Serial No. 259,897.

*To all whom it may concern:*

Be it known that I, EDWARD H. SCHULZ, a citizen of the United States, residing at Fort Wadsworth, in the county of Richmond, city and State of New York, have invented a new and useful blast-meter for measuring the effect of blast of guns and of explosives and concussions of air or other gases and for measuring pressures due to wind or other causes, of which the following is a specification.

My invention relates to an instrument which may be placed in the vicinity of explosive charges, and particularly near guns of large caliber, for the purpose of determining the relative dynamic effect or energy of the blast, either direct or back blast, caused by the sudden detonation of explosives in the chamber of a gun, or elsewhere; and also for measuring sudden changes in atmospheric or other gaseous pressure, due to wind velocity or other causes.

More specifically, the object of my invention is to provide an instrument of the above character which may be used to accurately determine the relative force of the blast at different distances and directions from the center of the disturbance, and also to enable the intelligent comparison of the force of different explosions.

The instrument will be found especially useful in determining the blast effect on the material and personnel in the vicinity of seacoast guns and in adjacent gun positions; in determining the blast effect in turrets, etc. of battleships; and in determining concussion of the atmosphere produced by different kinds of explosives.

To this end my invention consists in the construction and arrangement of parts hereinafter described, and illustrated in the accompanying drawings, in which:

Figure 1 is a somewhat diagrammatical view illustrating the type of apparatus adapted for determining both direct and back blast, the parts being shown in section. Fig. 2 is a similar view illustrating apparatus for determining direct blast only. Fig. 3 is a central vertical section, on the line 3—3 of Fig. 4, showing my improved instrument assembled in its case, ready for use. Fig. 4 is a transverse horizontal section on the line 4—4 of Fig. 3. Fig. 5 is a fragmentary detailed elevation on an enlarged scale, showing the scale of the instrument, and associated parts. Fig. 6 is a transverse section on the line 6—6 of Fig. 5. Fig. 7 is a fragmentary sectional view showing a funnel shaped mouth piece which I may employ.

The principle which I employ is based upon the compression of a definite quantity of a gas confined in a reservoir, such compression of the gas being produced by the impact of the blast wave acting through a tube of definite diameter, communicating with the medium in which the blast is produced, and, further, upon the fact that the energy of the wave is proportional to the product of the area upon which it acts, the mean resistance which it encounters, and the amount of movement produced by the blast against this resistance. These facts will be further explained in connection with the description of the operation of the instrument.

Referring to the drawings in detail, my apparatus comprises a U-tube, $c$, $d$, having an extended open end, $a$, communicating with the atmosphere or other medium in which the blast is produced. The other end of said tube connects with a closed reservoir, $e$, containing air, or other readily compressible gas. Communicating with one end of the U-tube near its connection with the reservoir, and having both ends set into the reservoir at $k$, $l$, is a second U-tube $f$, $g$, preferably of smaller dimensions than the first. The first U-tube will be referred to as the "water" tube, and the second as the "meter" or "scale" tube. At the bottom of the scale tube is a cock $j$, and a cock $i$ controls communication with the reservoir $e$.

The above described parts constitute the essential features of the apparatus for determining direct blast. In practice, however, I prefer to mount the apparatus on a panel $z$, slidably held in a casing $v$, as clearly shown in Figs. 3 and 4. I also preferably form the reservoir $e$ in two sections, as shown and provide suitable pipes extending from the cocks $i$ and $j$ through the top and bottom of the casing.

As shown in Fig. 3 I may, and preferably do provide a set of interchangeable and adjustable mouthpieces, $s$, adapted to be attached to the end $a$ of the tube $c$, which extends through the wall of the casing, and capable of being turned in the direction of the blast. In some cases, where the blast is weak, or the distance from the center of the disturbance great, I may find it desirable to provide a funnel shaped mouthpiece $s'$, as clearly illustrated in Fig. 7. Also, as shown in dotted lines in Fig. 2, I may mount one or more such funnel shaped mouthpieces $t$, on a turret provided with a vane $t'$, which will serve to automatically turn the funnel opening in the direction of the blast.

In order that the height of liquid in the tubes may be observed, as hereinafter explained, I provide the water tube $c$ with a glass sight opening $c'$, and the scale tube $g$ with a sight opening $g'$ (see Fig. 5). Adjacent the sight opening $g'$ I arrange a scale, $u$, suitably calibrated. Supporting feet or brackets $w$ are preferably secured to the casing to render the same more stable, and a level $x$, is mounted in the casing so as to indicate to the observer when the instrument is properly set to take a reading.

The method of using the instrument and its principle of operation will now be explained.

The instrument as shown in Fig. 3 is placed at any desired point at which the force of the explosion is to be measured. Water or other liquid is then poured into the open end, $a$, of the tube $c$, until it fills the legs $c$, $d$ to the level indicated by $b$, $b'$ in Fig. 1, viz., to the point of juncture of the water tube with the scale tube, and overflows into the scale tube, the cock, $j$ being closed, and $i$, open. After the water tube has been thus filled, the cock $j$ is opened and the liquid allowed to run out of tube $f$, $g$, until it assumes a level such as indicated by the line $h^0$, in Fig. 1, which level corresponds to the zero mark on the scale $u$. Both cocks $i$ and $j$ are then closed, and the apparatus is ready for the taking of an observation. When the explosion occurs, the impact of the blast wave, entering the open end $a$ of the tube $c$ momentarily forces the liquid down to some such level as $b^2$, at the same time causing the same volume of water to run over at $b'$ into the scale tube, and fill the same to some such level as $h$, $h'$. The liquid in the water tube immediately regains its equilibrium, but that portion which has been forced over into the scale tube is entrapped therein and serves as a record of the amount of liquid displaced. The height of this liquid column in the tube $g$ may be observed through the sight opening $g'$, and compared with the figures on the scale $u$. It will also be observed that the liquid level in the scale tube in rising, has compressed the gas confined in said tube and reservoir $e$, and in so doing, has performed a definite amount of work upon said gas. During the movement of the column of liquid in the water tube from $b$ to $b^2$, therefore, the compression of the gas in the reservoir resulted in a mean effective pressure being produced, against which pressure the movement had to occur. The work done, therefore, is measured by the product of this mean effective pressure, the area of the tube $c$, and the distance $b$, $b^2$, through which the pressure was overcome. The last two factors, namely, the area of the liquid column times the distance through which it moves, expresses simply the volume of liquid displaced by the blast, and this exact volume has been entrapped in the scale tube. Therefore, by knowing the exact ratio between the areas of the water and scale tubes, it is obvious that the distances $b$, $b^2$ can be determined by observing the height of the column $h$, $h^0$. Now it will be noted that the amount of compression of the gas in the reservoir, or, in other words, the mean effective pressure against which the liquid column was moved, and which is the other factor in the energy equation, is also proportional to the height of the column in the scale tube, since, as will be obvious, the higher this column rises, the more will the confined gas be compressed. It is therefore evident that the height of the column in the scale tube serves as an index both of the mean effective pressure, and the distance through which it has been overcome, and hence is an accurate register of the work performed per unit of tube area. It is thus possible to so calibrate the scale $u$ that the energy of the blast per unit of surface may be read directly therefrom.

In some instances, where it is desirable to determine the force of a back or negative blast, due to the sudden rarefaction of the air or other medium, from any cause, I provide the additional apparatus illustrated at the left of Fig. 1. This consists of a scale tube $o$, $p$, of U-shape, communicating with the water tube near its open end. When the two scale tubes, $o$ $p$, and $f$, $g$, are employed in the same apparatus, as shown in Fig. 1, the point of juncture of both tubes with the water tube is at the same level, and the liquid fills the tube to this level. It is therefore evident that, upon any sudden rarefaction of the atmosphere, or other medium with which the mouth $a$ of the tube communicates, the confined gas in the reservoir $e$ will expand, and force a portion of the liquid over into the tube $o$, $p$, where it will assume some such level as $g$ $g'$. The height of this column, will, as explained above, serve to indicate the force of the negative blast or rarefaction.

It will thus be seen that I have provided a very simple and convenient instrument for accurately determining sudden variations of pressure existing in any elastic medium and it is thought that the many uses and advantages of my invention will be readily appreciated by those experienced in such matters.

What I claim is:

1. A blast meter comprising a reservoir containing a gas, a tube extending from said reservoir and communicating with the medium in which the blast is produced, a liquid in such tube so arranged as to be displaced by the force of the blast against the pressure of the confined gas, and means for entrapping the liquid so displaced, whereby such entrapped liquid constitutes a record of the force of the blast.

2. A blast meter comprising a reservoir containing a gas, a U-tube communicating at one end with said reservoir, and at the other end with the medium in which the blast is produced, a meter or scale tube connected with said U-tube and reservoir, and a liquid filling said U-tube to its point of connection with the scale tube, whereby a portion of said liquid is forced over into said scale tube by the impact of the blast.

3. A blast meter comprising a U-tube closed at one end, and open at the other, a meter or scale tube communicating with said U-tube near its closed end, and a liquid filling said U-tube to its point of connection with said scale tube, the arrangement being such that the impact of a blast acting through the open end of said U-tube, forces a definite amount of the liquid over into said scale tube.

4. A blast meter comprising a U-tube, closed at one end, and open at the other, a second U-tube having one end joined to the closed end of the first tube, and having its other end closed, a liquid filling said first tube to its point of juncture with the second, and a scale associated with said second tube, whereby the impact of the blast, acting through the open end of the first tube, forces a portion of the liquid over into the second tube, and the amount so forced over may be read from the scale.

5. A blast meter comprising a U-tube, open to atmosphere at one end, a reservoir containing a gas, communicating with the other end of said tube, a scale tube joined to each leg of said U-tube at the same level, and a liquid filling said U-tube to the point of juncture of the scale tubes, whereby, the impact of a direct blast will force a portion of said liquid over into one of said scale tubes, and the expansion of the gas in said reservoir under the influence of a negative blast, will force a portion of said liquid over into the other scale tube.

6. A blast meter comprising a U-tube, open to atmosphere at one end, a reservoir containing a gas communicating with the other end of said tube, a scale-tube joining said U-tube adjacent its open end, and a liquid filling said U-tube to its point of juncture with the scale tube, whereby the expansion of the gas in said reservoir, under the influence of a negative blast, will force a portion of said liquid over into said scale tube.

In witnesss whereof I have signed my name to this specification in the presence of two witnesses.

EDWARD H. SCHULZ.

Witnesses:
E. von Diezelski,
Emil F. Maum.